Figure 1:
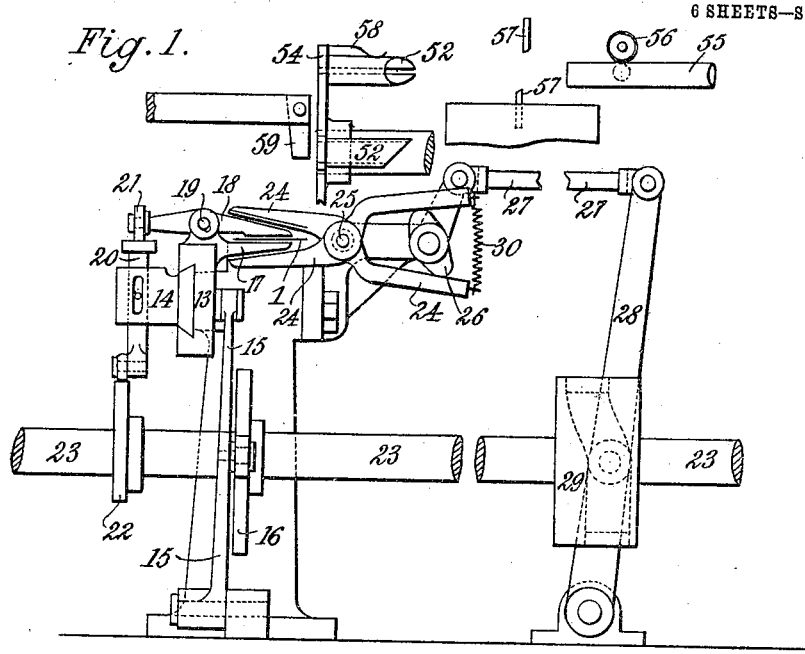

J. GUÉNIFFET, A. BENOIT & J. NICAULT.
MACHINE FOR MAKING AND FITTING MOUTHPIECES TO CIGARETTE TUBES OR CASES.
APPLICATION FILED MAY 9, 1901.

953,417.

Patented Mar. 29, 1910.

6 SHEETS—SHEET 1.

J. GUÉNIFFET, A. BENOIT & J. NICAULT.
MACHINE FOR MAKING AND FITTING MOUTHPIECES TO CIGARETTE TUBES OR CASES.
APPLICATION FILED MAY 9, 1901.
953,417.
Patented Mar. 29, 1910.
6 SHEETS—SHEET 2.
Fig. 2.
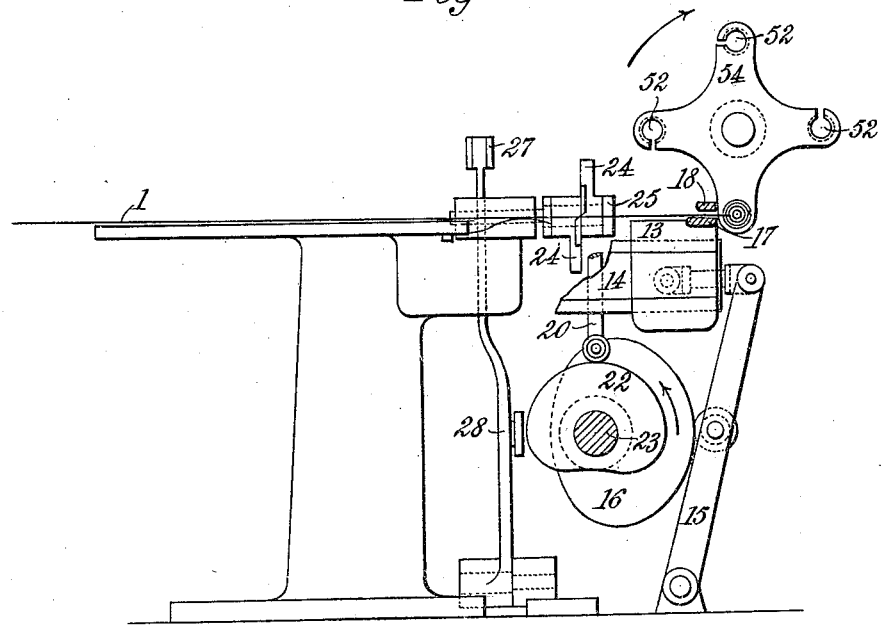
Fig. 13.
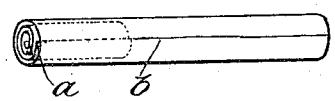
Fig. 11.    Fig. 12.
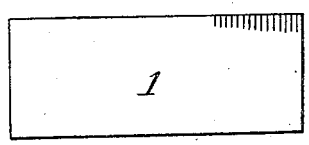 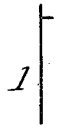
WITNESSES:
René Bruine
Fred White
INVENTORS:
Julien Guéniffet, Anatole Benoit and Jules Nicault,
By their Attorneys:
Arthur O. Dreser J. GUÉNIFFET, A. BENOIT & J. NICAULT.
MACHINE FOR MAKING AND FITTING MOUTHPIECES TO CIGARETTE TUBES OR CASES.
APPLICATION FILED MAY 9, 1901.

953,417.

Patented Mar. 29, 1910.

6 SHEETS—SHEET 3.

WITNESSES:

INVENTORS:

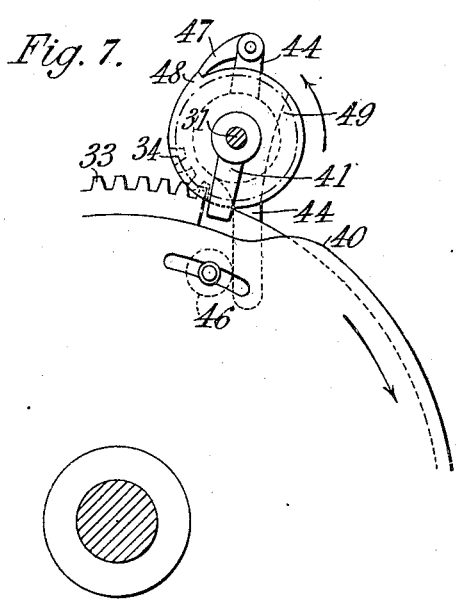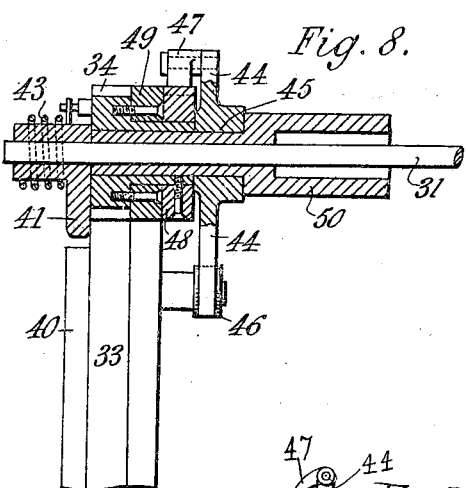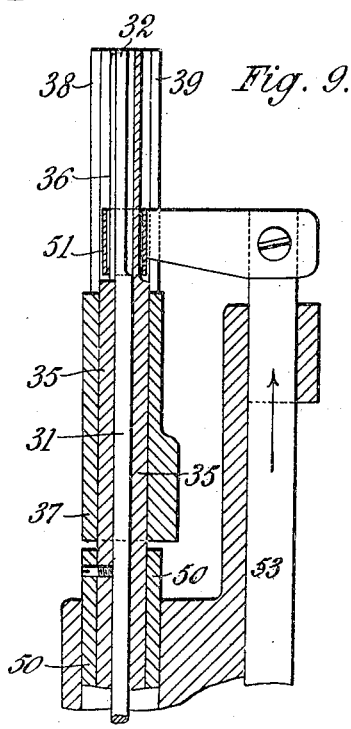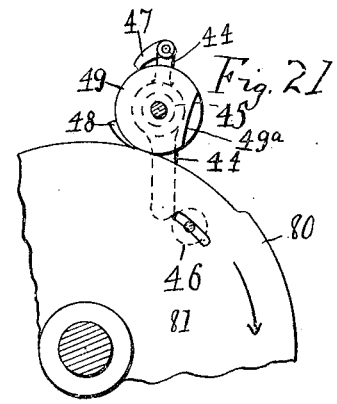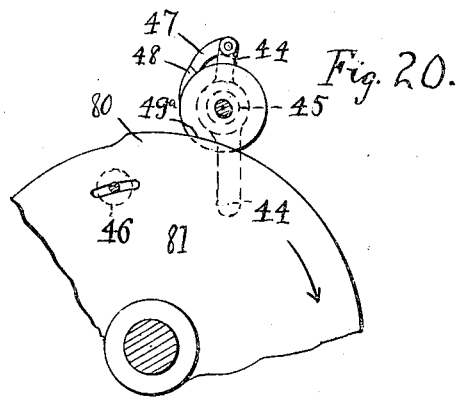

J. GUÉNIFFET, A. BENOIT & J. NICAULT.
MACHINE FOR MAKING AND FITTING MOUTHPIECES TO CIGARETTE TUBES OR CASES.
APPLICATION FILED MAY 9, 1901.
953,417.
Patented Mar. 29, 1910.
6 SHEETS—SHEET 5.
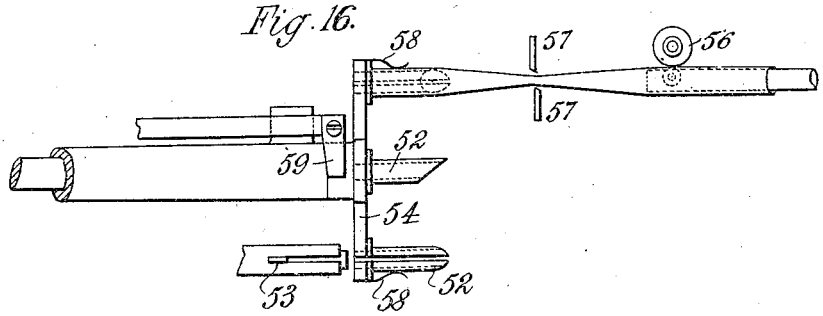
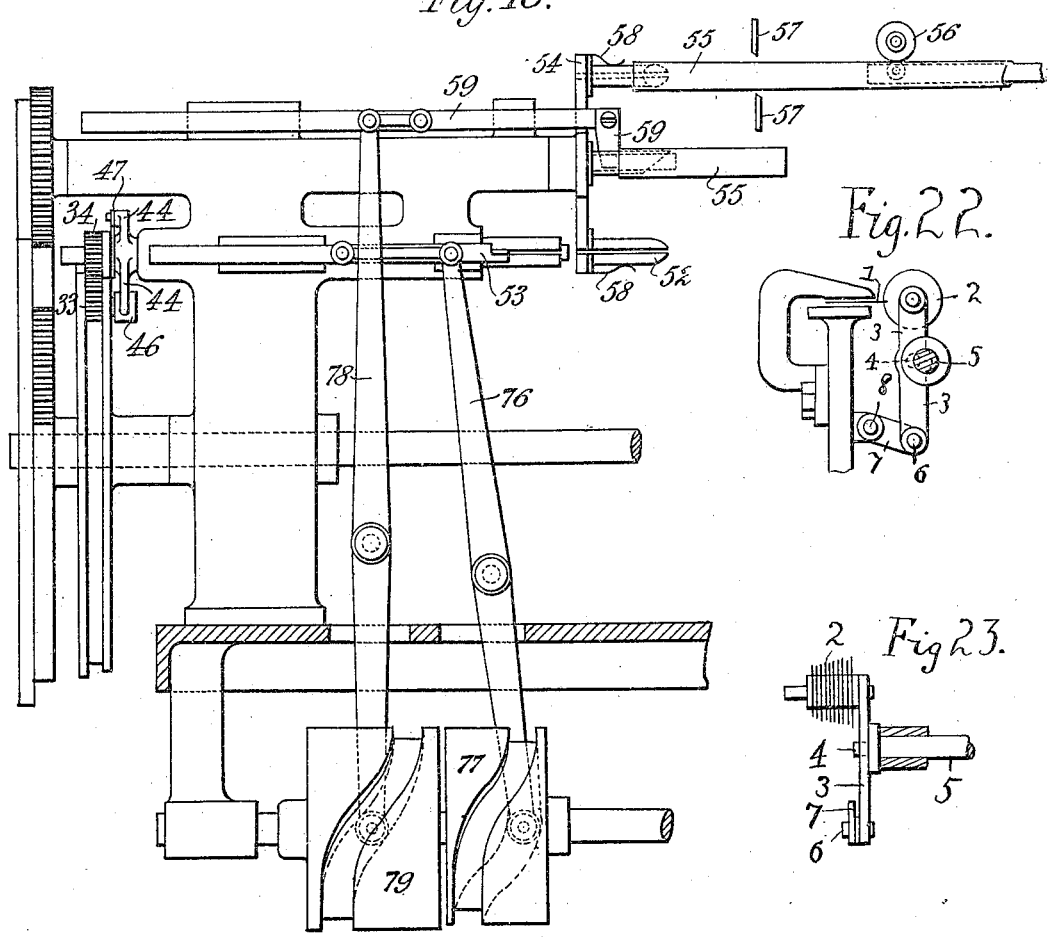
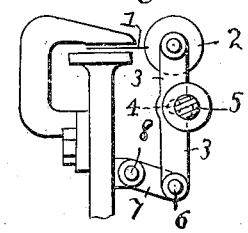
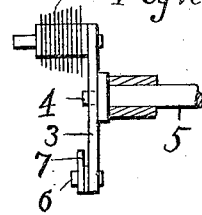
WITNESSES:
INVENTORS:

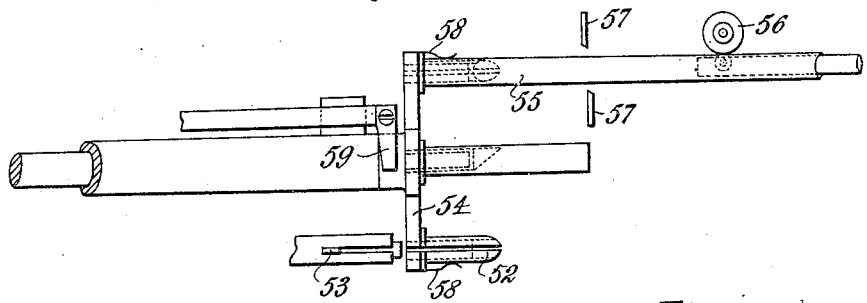
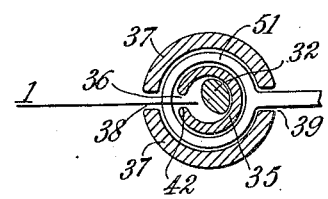
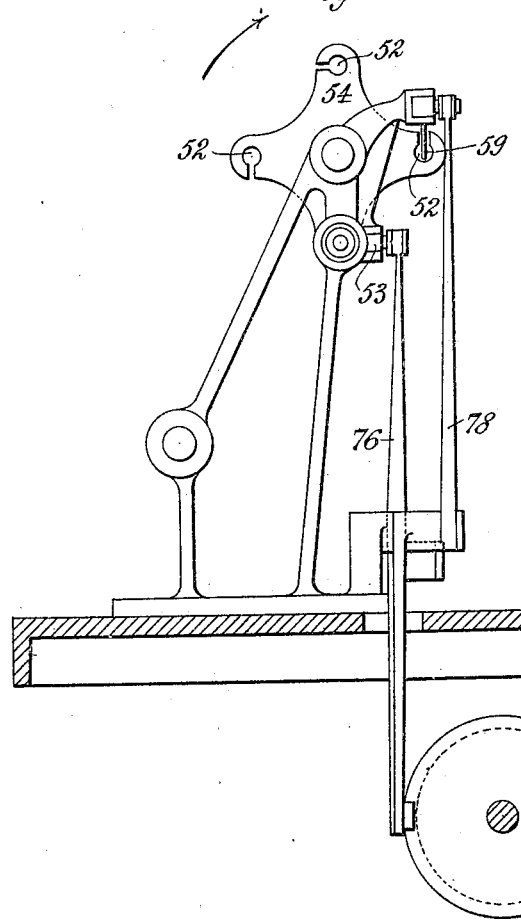
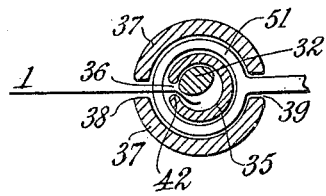
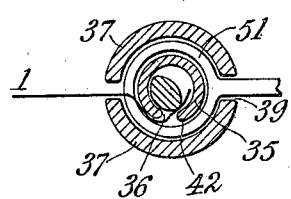

UNITED STATES PATENT OFFICE.

JULIEN GUÉNIFFET, ANATOLE BENOIT, AND JULES NICAULT, OF PARIS, FRANCE.

MACHINE FOR MAKING AND FITTING MOUTHPIECES TO CIGARETTE TUBES OR CASES.

953,417.  Specification of Letters Patent.  Patented Mar. 29, 1910.

Application filed May 9, 1901. Serial No. 59,476.

*To all whom it may concern:*

Be it known that we, JULIEN GUÉNIFFET, ANATOLE BENOIT, and JULES NICAULT, citizens of the Republic of France, and residents of Paris, France, have jointly invented certain new and useful Improvements in Machines for Making and Fitting Mouthpieces to Cigarette Tubes or Cases, of which the following is a specification.

In our improved machine we have overcome the drawbacks of the angularly cut mouthpiece, by replacing such mouthpiece by a rectangular mouthpiece, toothed or serrated along a portion of one of its edges. Before rolling, these teeth (which may be either parallel-sided or serrated) are turned up at a right angle, and the mouthpiece is rolled in such manner that the turned up teeth of serrations are in the interior of the tube formed. These teeth oppose the passage of the tobacco when the cigarette is filled, this allowing of dispensing with the plug of cotton wool which it has been usual to place in the tubes or cases. The rib or edge formed by the outer extremity of the mouthpiece when it is rolled, is hidden by the seam formed by the fastening down of the edge of the paper forming the cigarette tube or case. This result is obtained by a suitable adjustment of the parts which feed the mouthpiece paper, and by the employment of rolling devices of suitably selected dimensions.

The principle of the machine is as follows: The paper which is to form the mouthpiece is fed from a reel, from which it is drawn by grippers; it is first cut with teeth or serrations, then these latter are turned up at a right angle. The paper is then brought opposite the rolling device, then the length of paper is cut off and the rolling device rolls it upon a fixed barrel or mandrel. Upon this rolling device slides an extractor ring, which pushes the rolled mouthpiece into an oblique-ended tube forming part of a table or plate which rotates with an intermittent movement upon a fixed spindle. This tube is cut with an oblique end to allow the cigarette cases to pass on to same more easily, its diameter being moreover less than that of the cigarette case. When the mouthpiece has passed from the fixed barrel or mandrel of the rolling device into the movable tube, the table which carries this latter turns to the extent of a quarter revolution and brings this tube opposite the cigarette case or tube, which advances, and a length of the case or tube is cut off. The table then turns for another portion of a revolution, and the tube containing the mouthpiece and the case comes opposite the extractor, which pushes out the mouthpiece and the case. The extractor, continuing its travel, causes the cigarette to fall into an unrolling apparatus which causes it to turn in the opposite direction to that of the rolling of the mouthpiece in order to allow this latter to apply itself with exactness against the interior of the case, and to fit sufficiently tightly against the walls of the case. The gripper which rolls the paper to form the mouthpiece is composed of a nipper having imparted to it an intermittent movement of rotation transmitted thereto by means of a toothed sector and of a stop which arrests this movement when the sector has ceased to act upon the pinion which drives the rolling device.

The hiding of the outer longitudinal edge or seam of the mouthpiece under the seam of the tube is insured by presenting the mouthpiece and the tube with their seams in predetermined positions such that when assembled they are in line with each other. Preferably these pieces of the shell,—the mouthpiece and the tube,—are received in sucession on a carrier to which they are presented and upon which they are placed with their seams in said predetermined positions, relatively to the carrier, so that when the second piece is placed on the carrier its seam is in alinement with that of the piece which was first placed on the carrier.

Figure 3:
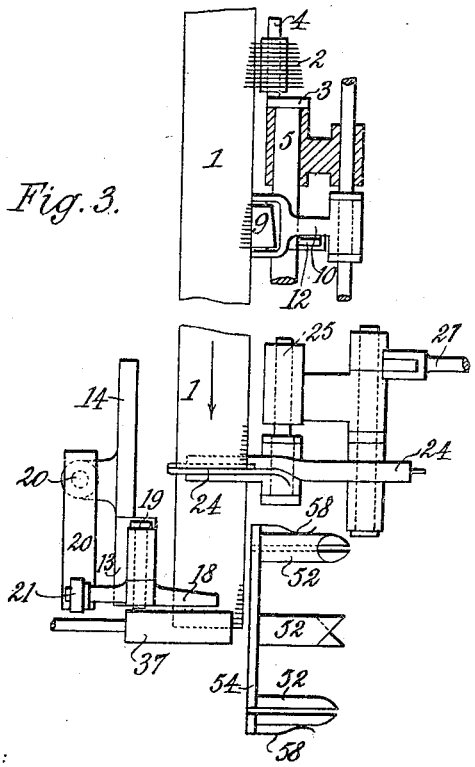
Figure 4:
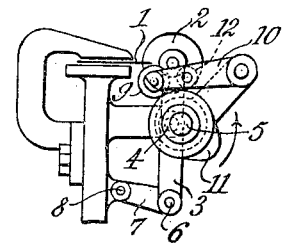
Figure 5:
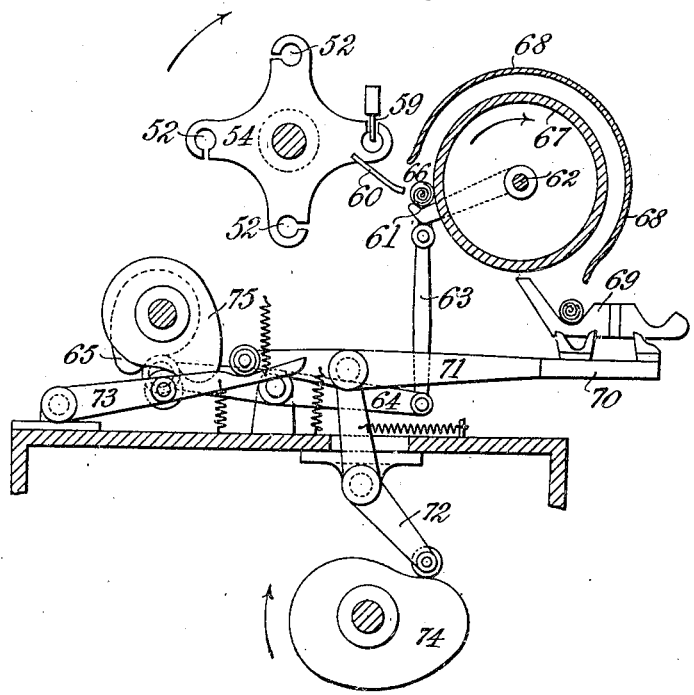
Figure 6:
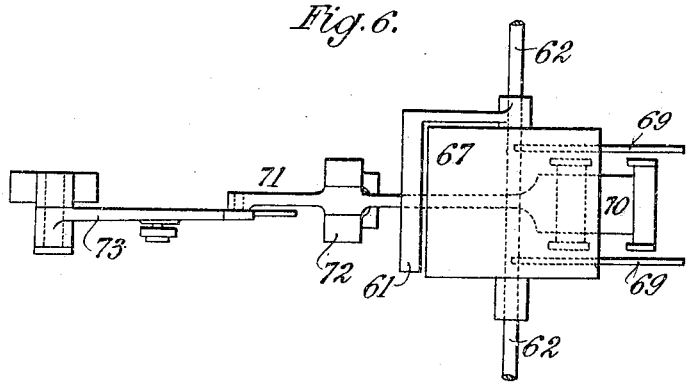

The principal parts of our machine are represented in front elevation Figure 1, in side view Fig. 2 and in plan Fig. 3. Fig. 4 shows in front view the mechanism for forming and turning up the teeth or serrations on the paper which is to form the mouthpieces. Figs. 5 and 6 show in face view and in plan the unrolling mechanism. Figs. 7, 8 and 9 are an end view, a longitudinal section and a horizontal section of the mechanism which actuates the rolling device. Fig. 10 represents on a larger scale a transverse section of the rolling device. Figs. 11 and 12 show in face view and in section a paper intended to form a mouthpiece, this paper being provided on one of its edges with parallel notches or cuts to form parallel-sided teeth. Fig. 13 shows the relative position of the mouthpiece fitted to the cigarette case. Figs. 14 and 15 show two positions of the rolling device during the course of the work. Figs. 16, 17, 18 and 19 show different positions representing the introduction of the mouthpiece into the cigarette case. Figs. 20 and 21 show the operation of the stop for arresting the movement of the toothed sector. Figs. 22 and 23 show the operation of the cutting device.

The paper 1 from a reel passes first to a position opposite the mechanism for forming and turning up the teeth. This mechanism, represented in Figs. 3 and 4, is composed of circular steel blades or cutters 2, which produce the teeth or cuts on the band 1; these blades 2 are fixed on a lever arm 3 carrying a crank pin 4 in rigid connection with the shaft 5 (see Figs. 22 and 23). The lower part of the lever 3 is connected at 6 to an arm 7 pivoted at 8; in consequence of this arrangement, when the shaft 5 turns, the cutter blades 2 have an elliptical movement imparted to them, which causes them to make the cuts in the paper 1 (Fig. 11). When the paper has traveled forward for a distance corresponding to the length necessary for the formation of a mouthpiece, the teeth or cuts formed therein come opposite a rubber cylinder 9 intended to turn the teeth up at a right angle. This cylinder 9 is mounted at the extremity of an arm 10 actuated by a cam 11 acting upon a roller 12 fixed to the arm 10, and which in lifting this arm, turns up the teeth at a right angle. The teeth constituted by simple cuts may be replaced by teeth of various other styles, the cutting mechanism of course being correspondingly modified. The paper 1 thus prepared is fed forward automatically by an arrangement of two jaws mounted upon a carriage 13 which moves horizontally on the framing 14 under the action of a lever 15 and of a cam 16. One of the jaws 17 is fixed on the carriage 13, and the other 18, which is movable, is pivoted at 19, and closes under the action of a lifter bar 20, which constitutes a path for the roller 21 of the jaw 18. The lifter bar 20 is actuated by a cam 22 keyed on the shaft 23. The paper fed by the jaws is cut to the required length by shears 24—24, pivoted together at 25, the opening of the shear blades being effected by a cam 26, actuated by a rod 27 and a lever 28 operated by a cam 29; the blades of the shears cut the paper by closing under the action of a spring 30.

The mechanism for rolling the paper cut off by the shears is shown in Figs. 7 and 10. The rolling device is composed principally of a rod 31 and a tube 35. The rod 31 has an eccentric portion 32, which serves to nip the edge of the paper for the mouthpiece against the side 42 of a slot 36 formed in the tube 35. The rod 31 with its eccentric portion 32 is placed in the tube 35, slotted at 36, around which the paper to form the mouthpiece is to be rolled. This paper is rolled in the space existing between the exterior of the tube 35 and the interior of a fixed barrel or tube 37 provided with two slots 38, 39. The rod 31 carrying the nipper 32 is actuated with a slight angular movement of alternate rotation about its axis. For this purpose there is fixed upon the rod 31 at the end opposite to the nipper 32, a small lever 41, which turns with the rod 31, and which is adapted to be returned by a small coiled spring 43. One extremity of this spring is fixed relatively to the lever, while the other extremity is fixed to this lever 41. The alternate angular movement of the rod 31 is obtained in one direction by the boss of a cam 40 which acts on the free extremity of the lever 41; the reverse movement is effected by means of the spring 43 which is released when the boss of the cam has ceased to act on the lever 41. These movements thus produce the opening and the closing of the nipper 32, and it is the spring 43 which produces the movement which serves to nip the paper for the mouthpieces against the edge 42 of the slot 36 formed in the tube 35. The rod 31 and its nipper 32 are fitted in the interior of the tube 35; the paper which is nipped against the edge 42 of the slot 36 by the nipper 32 is fixed to the body or main portion of the tube 35. The other extremity of the tube 35 is fixed to; the body or main portion of the rolling device 50, to which the driving parts are connected.

A lever 44, pivoted at 45, and which is actuated by a roller 46 carries a ratchet 47, which acts upon a ratchet wheel 48 and causes the pinion 34 to gear with the sector 33 when this latter comes into action. Upon the sleeve of the pinion is fixed a stop 49, which arrests the motion of the rolling device when the mouthpiece is finished, the nipper 32 being released from the gripping position.

As shown in Figs. 20 and 21 the stop mechanism comprises a roller 49, one portion of the circumference of which is cut out as shown at 49ª to a curve corresponding with the curve of the largest portion 80 of the disk 81 which is fixed on the same shaft with the sector 33 and the cam 40. While the highest portion 80 of the disk 81 is in engagement with the cut out portion 49ª of the stop 49, the shaft 45 is prevented from turning. But when the portion 80 passes beyond the roller 49, then the shaft 45 is free to turn. This is a well known form of stop motion, and it will be understood that any other suitable device for this purpose may be used.

The toothed pinion 34, the stop 49 and the ratchet wheel 48 are connected rigidly together and are keyed upon the body or main portion 50 of the rolling device.

When the machine operates, the paper 1 is first engaged in the tube 35 as shown in Fig. 10, the nipper 32 being released or in the non-nipping position. When the cam 40 has freed the lever 41, the spring 43 is released and the nipper 32 grips the edge of the paper 1 (Fig. 14). At this moment the toothed sector 33 mounted on the same spindle as the cam 40 comes into gear with the pinion 34 and imparts rotation thereto and to the rod 31 and its nipper (Fig. 15). When the mouthpiece is rolled, the toothed sector 33 leaves the pinion 34 and the stop 49 rigidly connected to this pinion arrests its movement. When the rolling device has rolled the mouthpiece in the fixed tube 37 an extractor ring 51 pushes it forward into the funnel-like tube 52 which is opposite; the extractor ring 51 is actuated by a slide 53 operated by a lever 76 moved by a cam 77 (Fig. 18). The tubes 52 are carried by a rotating drum or table 54 and are slotted and have their ends cut obliquely to allow the paper tube 55 fed by the rollers 56 to pass freely on to the tube which already carries the mouthpiece, before being cut by the shears 57 (Fig. 16); this paper tube is kept in place by a leaf spring 58. The table 54 then makes a quarter turn and the length of paper tube which has been cut comes opposite an extractor 59 (Fig. 17). In this position a mouthpiece is in the funnel-tube, the cut length of paper tube is on the funnel-tube and only the wall of this tube separates them. It is only necessary now to expel them together, and the mouthpiece will remain in the paper tube or case 55 and the exterior ends of the mouthpiece and of the tube 55 will be level or flush with each other. This operation is effected by the extractor 59 (Fig. 18) which is operated by a lever 78 actuated by a cam 79. When the extractor 59 has expelled the paper case from the tube 52, this case provided with its mouthpiece, is complete, and it only remains to unroll it to fix the mouthpiece in the desired position and cause it to adhere to the interior of the paper case. For this purpose the case provided with the mouthpiece, which is flush with its edge, and the exterior longitudinal edge a (Fig. 15) of which is placed under the seam or fastened-down edge b of this case, falls upon an inclined plane 60 which conducts it on to a fork 61 (Fig. 5) adapted to pivot on a spindle 62 under the action of a connecting rod 63 and of a lever 64 actuated by a cam 65. The fork 61 raises the tube or case provided with its mouthpiece to the entrance 66 of the unrolling apparatus, which is constituted by a rotating cylinder 67 and a concentric fixed casing 68. The unrolling cylinder 67 receives the case and mouthpiece and causes same to turn or roll in the opposite direction to that of the rolling of the mouthpiece, in order to compel the mouthpiece to be applied with exactitude against the edges of the paper case. The case then falls upon a fixed receiver 69, whence a fork 70 carries it out of the machine; the delivery fork is capable of two combined movements to carry the case or tube from the first groove of the receiver to the second and to cause the case which is placed in the second groove to fall out. These movements are obtained by the combination of the levers 71, 72, 73 and of the cams 74 and 75.

We claim as our invention and our exclusive property.—

1. In a machine for making mouthpieces for cigarettes, the combination of means for producing teeth at one edge of a piece of paper, means for bending up said teeth, and means for rolling said paper to form a mouthpiece with said teeth projecting into its interior.

2. Means for fitting mouthpieces into cigarette tubes comprising in combination a drum or table 54 carrying a number of funnel-like tubes 52 having obliquely cut ends, means for placing the cigarette tubes upon said tubes 52 automatically, an extractor ring 51 for successively introducing the mouthpieces, and an unrolling mechanism composed of a rotating cylinder 67 and a fixed casing 68 adapted to unroll the mouthpiece in the tube.

3. The combination with means for forwarding mouthpiece material, of cutting devices acting upon the edge of the material and operating to produce a series of tongues thereon, and means independent of the cutting devices for turning the tongues at an angle to the body of the material.

4. In a machine for making a cigarette shell in two pieces, a tube and a mouthpiece, the combination with a means for presenting one of said pieces, of a carrier arranged to receive the other of said pieces in a predetermined position, means for moving one of said parts of the machine to bring the piece on the carrier while in such position into alinement with said presenting means, and means for assembling said pieces.

5. In a machine for making a cigarette shell in two pieces, a tube and a mouthpiece, the combination with a means for presenting one of said pieces, of a carrier arranged to receive the other of said pieces in a predetermined position, means for moving the carrier to bring the piece thereon while in such position into alinement with said presenting means, and means for assembling said pieces.

6. In a machine for making a cigarette shell in two pieces, a tube and a mouthpiece, the combination with a means for presenting one of said pieces, of a rotating carrier arranged to receive the other of said pieces in a predetermined position, means for rotating the carrier to bring the piece on the carrier while in such position into alinement with said presenting means, and means for assembling said pieces.

7. In a machine for making a cigarette shell in two pieces, a tube and a mouthpiece, the combination with a means for presenting one of said pieces, of a rotating carrier provided with a plurality of supports each adapted to receive the other of said pieces in a predetermined position, means for rotating the carrier to bring the piece on the carrier while in such position into alinement with said presenting means, and means for assembling said pieces.

8. In a machine for making a cigarette shell in two pieces, a tube and a mouthpiece, the combination with mechanism for feeding a continuous tube, of a tube carrier having a plurality of interior tube supports, means for cutting off and placing tube lengths on the supports, and means for operating the carrier.

9. In a machine for making a cigarette shell in two pieces, a tube and a mouthpiece, the combination with mechanism for feeding a continuous tube, of a tube carrier having a plurality of interior tube supports, means for cutting off and placing tube lengths on the supports, mouthpiece presenting means, means for operating the carrier to position the tube supports so that the tubes may receive the mouthpieces, and assembling devices.

10. In a machine for making a cigarette shell in two pieces, a tube and a mouthpiece, the combination with mechanism for feeding a continuous tube, of a rotating tube carrier having a plurality of interior tube supports, means for cutting off and placing tube lengths on the supports, mouthpiece presenting means, means for rotating the carrier to position the tube supports so that the tubes may receive the mouthpieces, and assembling devices.

11. In a machine for making a cigarette shell in two pieces, a tube and a mouthpiece, the combination with mechanism for feeding a continuous tube, of a rotating tube carrier having a plurality of interior tube supports, means for cutting off and placing tube lengths on the supports, mouthpiece presenting means, means for rotating the carrier to bring the tube supports into position opposite the mouthpiece presenting means with the seams of the tubes in alinement with the seams of the mouthpieces, and assembling devices.

12. In a machine for making a cigarette shell in two pieces, a tube and a mouthpiece, the combination with mechanism for feeding a continuous tube, of a tube carrier having a plurality of interior tube supports, of mouthpiece presenting means, means for operating the carrier to bring the tubes opposite the presenting means, means for inserting the mouthpieces in the tubes, and means for removing the tubes from the tube supports.

13. In a machine for making a cigarette shell in two pieces, a tube and a mouthpiece, the combination with means for presenting a mouthpiece, and means for presenting a tube, of a carrier adapted to receive a mouthpiece at one point in a predetermined position, and a tube at another with its seam in alinement with the position of the seam of the mouthpiece.

In witness whereof we have hereunto signed our names this 26th day of March 1901, in the presence of two subscribing witnesses.

JULIEN GUÉNIFFET.
ANATOLE BENOIT.
JULES NICAULT.

Witnesses:
   EDWARD P. MACLEAN,
   ALEXANDRE MATHEWS.